(12) United States Patent
Holman

(10) Patent No.: US 10,576,888 B1
(45) Date of Patent: Mar. 3, 2020

(54) CHILD SEAT ALARM

(71) Applicant: Daniel Holman, Lenoir, NC (US)

(72) Inventor: Daniel Holman, Lenoir, NC (US)

( * ) Notice: Subject to any disclaimer, the term of this patent is extended or adjusted under 35 U.S.C. 154(b) by 0 days.

(21) Appl. No.: 16/031,167

(22) Filed: Jul. 10, 2018

(51) Int. Cl.
*B60Q 9/00* (2006.01)
*G08B 21/02* (2006.01)
*B60N 2/90* (2018.01)
*B60N 2/00* (2006.01)
*B60N 2/26* (2006.01)

(52) U.S. Cl.
CPC .............. *B60Q 9/00* (2013.01); *B60N 2/002* (2013.01); *B60N 2/26* (2013.01); *B60N 2/90* (2018.02); *G08B 21/0266* (2013.01); *B60N 2002/981* (2018.02)

(58) Field of Classification Search
CPC . B60Q 9/00; B60N 2/90; B60N 2/002; B60N 2/26; B60N 2002/981; G08B 21/0266
USPC ...................................................... 340/425.5
See application file for complete search history.

(56) References Cited

U.S. PATENT DOCUMENTS

| 5,963,131 | A | * | 10/1999 | D'Angelo | .......... | G08B 13/1409 340/328 |
| 6,133,830 | A | * | 10/2000 | D'Angelo | .......... | G08B 13/1409 340/539.1 |
| 6,265,974 | B1 | * | 7/2001 | D'Angelo | .......... | G08B 13/1409 340/328 |
| 7,034,684 | B2 | * | 4/2006 | Boman | .............. | G08B 13/1427 340/539.11 |
| 7,205,894 | B1 | * | 4/2007 | Savage | ................... | A63B 55/00 340/568.6 |
| 7,274,292 | B2 | * | 9/2007 | Velhal | ................ | G08B 21/0227 340/10.2 |
| 7,453,357 | B2 | * | 11/2008 | Bernal-Silva | .......... | G08B 13/14 340/539.32 |
| 7,456,735 | B2 | * | 11/2008 | Naito | ...................... | B60R 25/24 340/539.11 |
| D635,352 | S | | 4/2011 | Himley | | |
| 9,139,128 | B1 | | 9/2015 | Lemons | | |
| 2003/0122671 | A1 | * | 7/2003 | Jespersen | ........... | G08B 13/1418 340/568.1 |
| 2006/0043181 | A1 | * | 3/2006 | Naito | ...................... | B60R 25/24 235/443 |
| 2007/0075575 | A1 | | 4/2007 | Gregory | | |
| 2014/0015664 | A1 | | 1/2014 | Watson | | |

(Continued)

FOREIGN PATENT DOCUMENTS

WO   2017065761   4/2017

Primary Examiner — Jack K Wang

(57) ABSTRACT

The child seat alarm is an alarm system. The child seat alarm is configured for use with a child safety seat. The child seat alarm: a) detects when a first person occupies the child safety seat; b) monitors the location of the child safety seat; c) monitors the location of a key fob that is in the custody of a second person; d) compares the span of the distance between the key fob and the child safety seat; and, d) generates an alarm at the key fob should the span of the distance between the key fob and the child safety seat become greater than a predetermined maximum distance. The child seat alarm comprises a CSS sensor module, a fob module, a child safety seat, and a wireless communication link. The wireless communication link establishes a communication link between the CSS sensor module and the fob module.

15 Claims, 3 Drawing Sheets

(56) References Cited

U.S. PATENT DOCUMENTS

| | | | |
|---|---|---|---|
| 2014/0035754 A1* | 2/2014 | Thielman | G08B 21/24 |
| | | | 340/686.6 |
| 2015/0228172 A1 | 8/2015 | DeZur | |
| 2016/0200250 A1* | 7/2016 | Westmoreland | B60Q 9/00 |
| | | | 340/457.1 |
| 2016/0210843 A1 | 7/2016 | Killette | |
| 2016/0339838 A1* | 11/2016 | Diaz | B60Q 9/00 |
| 2017/0048376 A1* | 2/2017 | Logan | H04M 1/72533 |
| 2017/0182938 A1 | 6/2017 | Wayne | |
| 2017/0323549 A1* | 11/2017 | Copulos | B60Q 9/00 |
| 2018/0056814 A1* | 3/2018 | Tanyi | B60N 2/002 |
| 2018/0065504 A1* | 3/2018 | Lan | B60N 2/002 |
| 2018/0326870 A1* | 11/2018 | Presna | B60N 2/002 |

* cited by examiner

CHILD SEAT ALARM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles including seats specially configured for vehicles, more specifically, a movable seat that further comprises electrical logic circuits.

SUMMARY OF INVENTION

The child seat alarm is an alarm system. The child seat alarm is configured for use with a child safety seat. The child seat alarm: a) detects when a first person occupies the child safety seat; b) monitors the location of the child safety seat; c) monitors the location of a key fob that is in the custody of a second person; d) compares the span of the distance between the key fob and the child safety seat; and, d) generates an alarm at the key fob should the span of the distance between the key fob and the child safety seat become greater than a predetermined maximum distance. The child seat alarm comprises a CSS sensor module, a fob module, a child safety seat, and a wireless communication link. The CSS sensor module mounts in the child safety seat. The fob module mounts in the key fob. The wireless communication link establishes a communication link between the CSS sensor module and the fob module.

These together with additional objects, features and advantages of the child seat alarm will be readily apparent to those of ordinary skill in the art upon reading the following detailed description of the presently preferred, but nonetheless illustrative, embodiments when taken in conjunction with the accompanying drawings.

In this respect, before explaining the current embodiments of the child seat alarm in detail, it is to be understood that the child seat alarm is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the child seat alarm.

It is therefore important that the claims be regarded as including such equivalent construction insofar as they do not depart from the spirit and scope of the child seat alarm. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and used of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
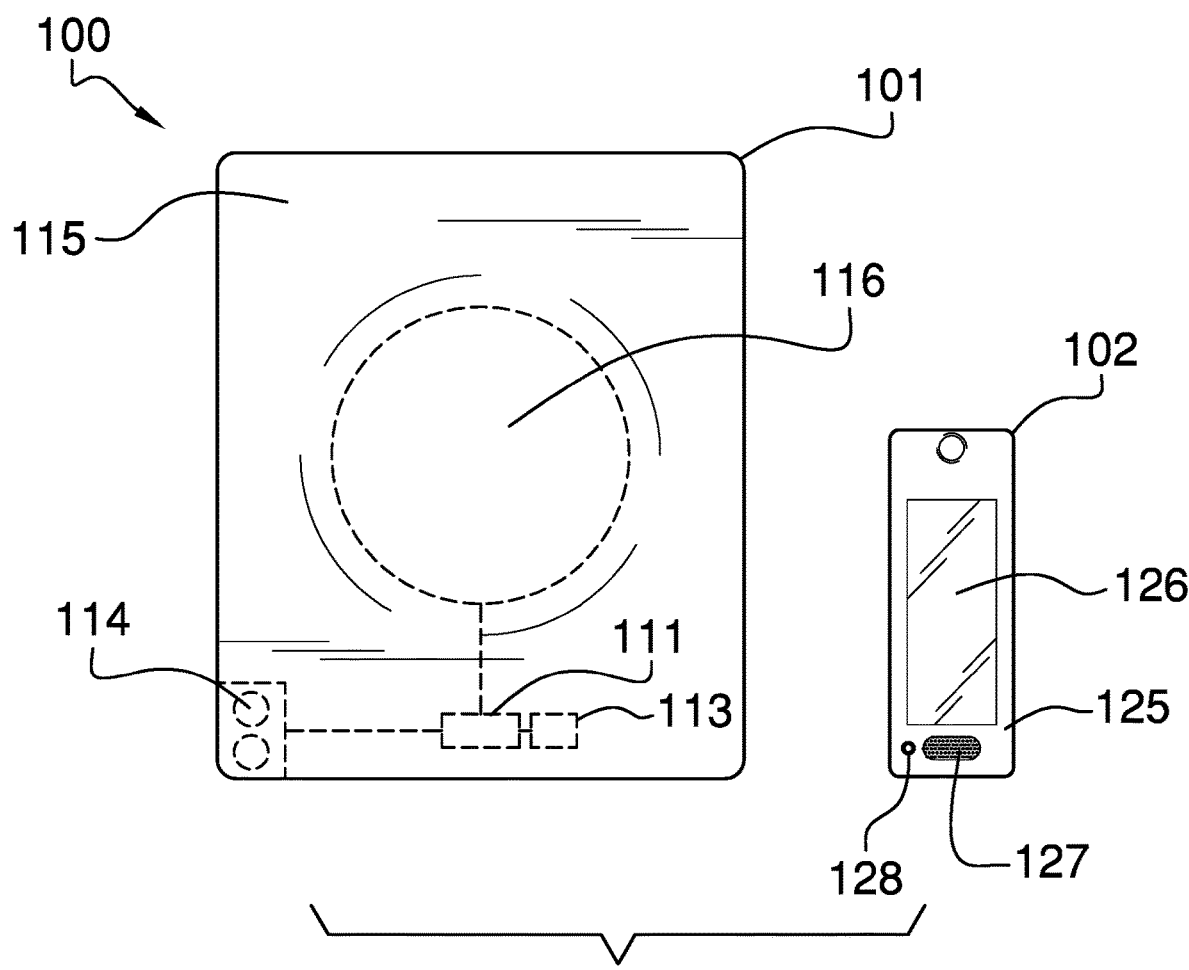
FIG. 1 is a front view of an embodiment of the disclosure.
Figure 2:
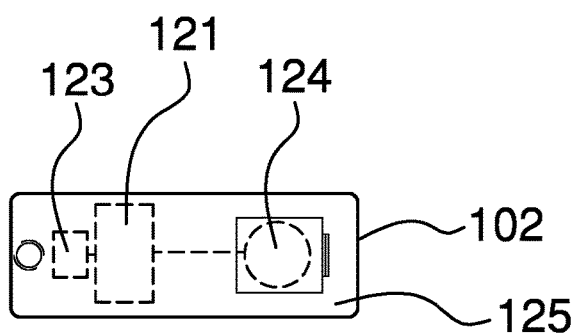
FIG. 2 is a detail view of an embodiment of the disclosure.
Figure 3:
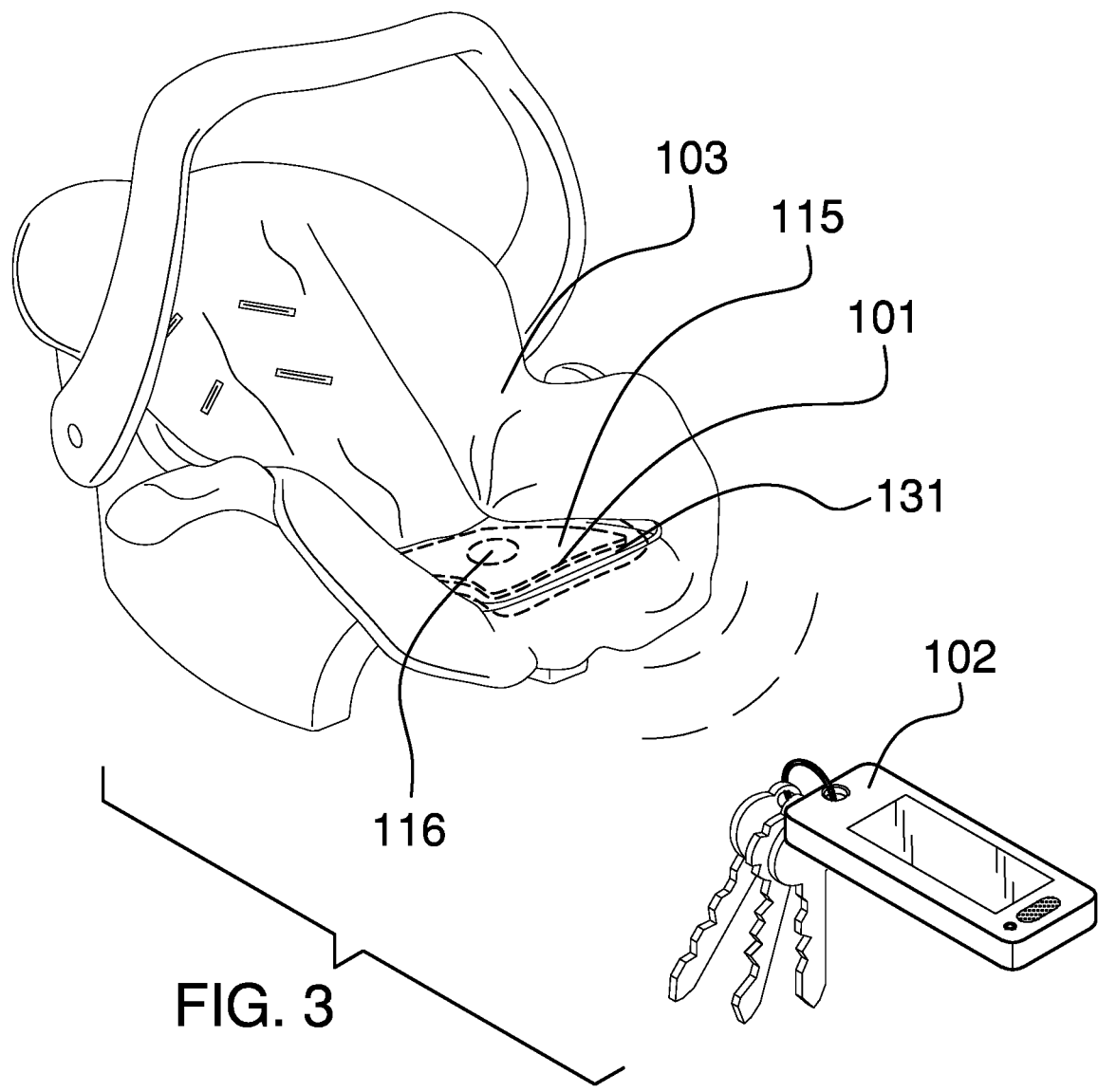
FIG. 3 is an in-use view of an embodiment of the disclosure.
Figure 4:
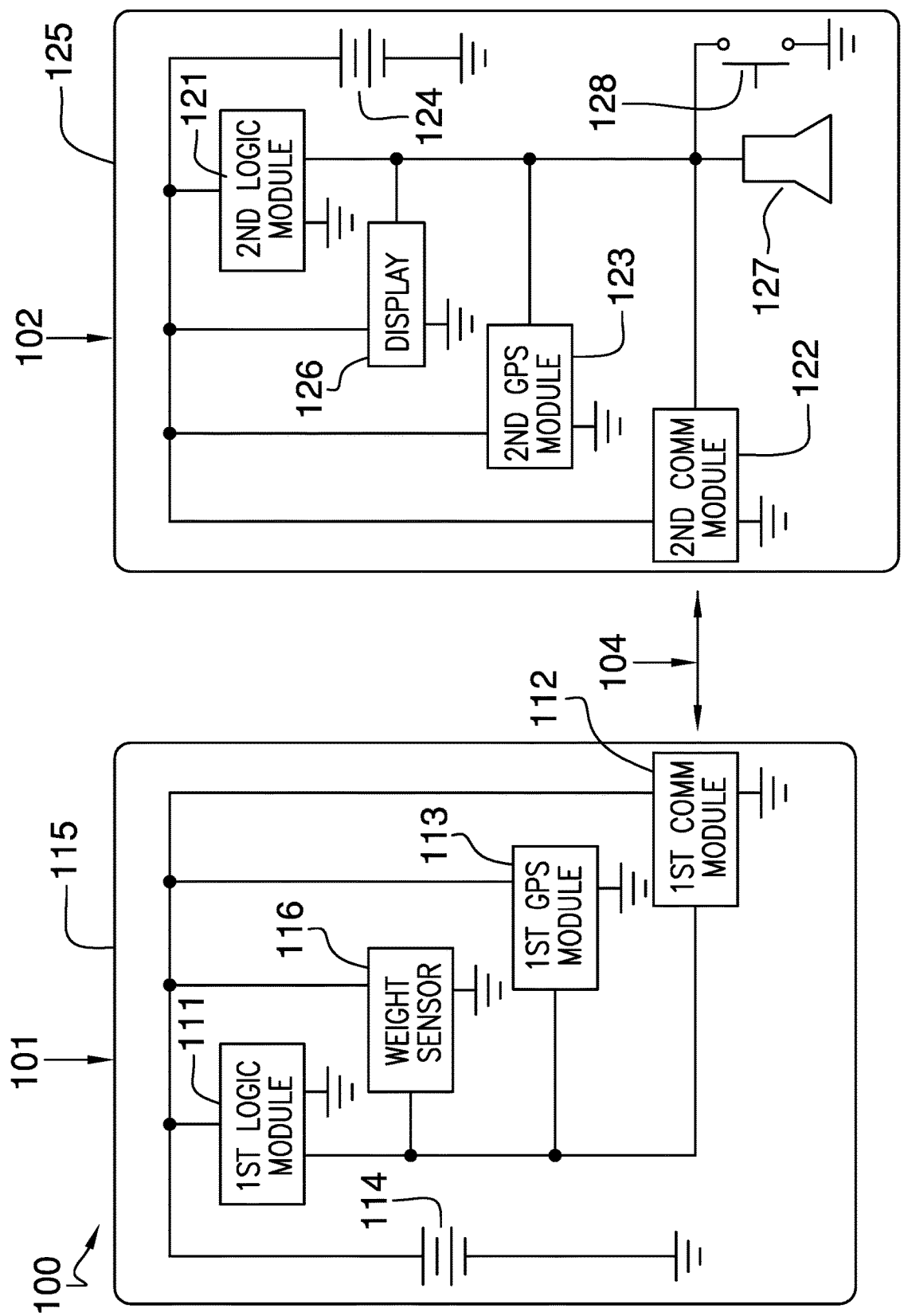
FIG. 4 is a block diagram of an embodiment of the disclosure.

Detailed reference will now be made to one or more potential embodiments of the disclosure, which are illustrated in FIGS. 1 through 4.

The child seat alarm 100 (hereinafter invention) is an alarm system. The invention 100 is configured for use with a child safety seat 103. The invention 100: a) detects when a first person occupies the child safety seat 103; b) monitors the location of the child safety seat 103; c) monitors the location of a key fob 125 that is in the custody of a second person; d) compares the span of the distance between the key fob 125 and the child safety seat 103; and, d) generates an alarm at the key fob 125 should the span of the distance between the key fob 125 and the child safety seat 103 become greater than a predetermined maximum distance. The invention 100 comprises a CSS sensor module 101, a fob module 102, a child safety seat 103, and a wireless communication link 104. The CSS sensor module 101 mounts in the child safety seat 103. The fob module 102 mounts in the key fob 125. The wireless communication link 104 establishes a communication link between the CSS sensor module 101 and the fob module 102.

The CSS sensor module 101 is an electrical circuit. The CSS sensor module 101: a) detects a weight of greater than or equal to 5.0 pounds (2.26 kg) in the child safety seat 103; b) determines the GPS coordinates of the CSS sensor module 101; and, c) transmits the GPS coordinates of the CSS sensor module 101 over the wireless communication link 104 to the fob module 102. The theory of operation of the CSS sensor module 101 assumes that if the CSS sensor module 101 detects a weight greater than or equal to five pounds in the child safety seat 103, then the CSS sensor module 101 is detecting the first person in the child safety seat 103.

The CSS sensor module 101 is contained within a CSS module housing 115. The CSS module housing 115 of the CSS sensor module 101 removably installs in the child safety seat 103 such that the CSS sensor module 101 can be used with a plurality of child safety seats 103. The CSS sensor module 101 comprises a first logic module 111, a first communication module 112, a first GPS module 113, a first battery 114, a CSS module housing 115, and a weight sensor 116.

The first logic module 111 is a readily and commercially available programmable electronic device that is used to manage, regulate, and operate the CSS sensor module 101. Depending on the specific design and the selected components, the first logic module 111 can be a separate component within the CSS sensor module 101 or the functions of the first logic module 111 can be incorporated into another component within the CSS sensor module 101.

The first communication module 112 is a wireless electronic communication device that allows the first logic module 111 to wirelessly communicate with the fob module 102 in the key fob 125. Specifically, the first communication module 112 establishes a wireless communication link 104 between the CSS sensor module 101 and the fob module 102. In the first potential embodiment of the disclosure, the first communication module 112 supports a communication protocol selected from the group consisting of a WiFi protocol or a Bluetooth protocol. The applicant prefers the use of a Bluetooth protocol.

The first GPS module 113 is an electrical device that communicates with the GPS to determine the GPS coordinates of the first GPS module 113. When queried by the first logic module 111, the first GPS module 113 transfers the GPS coordinates to the first logic module 111.

The first battery 114 is a commercially available chemical device. The first battery 114 provides the CSS sensor module 101 with the electrical energy required for the operation of the CSS sensor module 101.

The CSS module housing 115 is a housing. The CSS module housing 115 contains the balance of the CSS sensor module 101. The CSS module housing 115 is formed with all apertures and form factors necessary to allow the CSS module housing 115 to accommodate the use and operation of the CSS sensor module 101. Methods to form a housing suitable for the purposes described in this disclosure are well-known and documented in the mechanical arts.

The weight sensor 116 is a sensor formed from a piezoelectric material. The weight sensor 116 is positioned in the child safety seat 103 such that the weight sensor 116 deforms when the child safety seat 103. The first logic module 111 monitors the weight sensor 116. The first logic module 111 initiates the transmission of the GPS coordinates to the fob module 102 when the weight sensor 116 detects a weight greater than or equal to five pounds is detected in the child safety seat 103 by the weight sensor 116. The weight sensor 116 mounts on the exterior surface of the CSS module housing 115 such that the weight sensor 116 will detect the weight of the first person in the child safety seat 103.

The fob module 102 is an electrical circuit. The fob module 102 monitors the CSS sensor module 101 for a transmitted signal containing the GPS coordinates of the CSS sensor module 101. The fob module 102 receives the GPS coordinates of the CSS sensor module 101. The fob module 102 monitors the GPS coordinates of the fob module 102. The fob module 102 uses the GPS coordinates of the CSS sensor module 101 and the GPS coordinates of the fob module 102 to calculate the span of the distance between the fob module 102 and the CSS sensor module 101.

Should the span of the distance between the fob module 102 and the CSS sensor module 101 exceed a previously determined maximum distance, the fob module 102 generates an audible sound and tactile vibration used as an alarm. The theory of operation of the fob module 102 assumes that the fob module 102 will only receive the GPS coordinates from the CSS sensor module 101 when the first person has been detected in the child safety seat 103. Therefore, if the fob module 102 receives GPS coordinates from the CSS sensor module 101 that are greater than the previously determined maximum distance, an alarm is generated under the assumption that the second person has left the first person unattended in the child safety seat 103.

The fob module 102 comprises a second logic module 121, a second communication module 122, a second GPS module 123, a second battery 124, the key fob 125, a display 126, a speaker 127, and a reset switch 128.

The second logic module 121 is a readily and commercially available programmable electronic device that is used to manage, regulate, and operate the fob module 102. Depending on the specific design and the selected components, the second logic module 121 can be a separate component within the fob module 102 or the functions of the second logic module 121 can be incorporated into another component within the fob module 102.

The second communication module 122 is a wireless electronic communication device that allows the second logic module 121 to communicate with the CSS sensor module 101 wirelessly. Specifically, the second communication module 122 establishes a wireless communication link 104 between the fob module 102 and the CSS sensor module 101. In the first potential embodiment of the disclosure, the second communication module 122 supports a communication protocol selected from the group consisting of a WiFi protocol or a Bluetooth protocol. The applicant prefers the use of a Bluetooth protocol.

The second GPS module 123 is an electrical device that communicates with the GPS to determine the GPS coordinates of the second GPS module 123. When queried by the second logic module 121, the second GPS module 123 transfers the GPS coordinates to the second logic module 121.

The second battery 124 is a commercially available chemical device. The second battery 124 provides the fob module 102 with the electrical energy required for the operation of the fob module 102.

The key fob 125 is a housing. The key fob 125 contains the fob module 102. The key fob 125 is formed with all apertures and form factors necessary to allow the key fob 125 to accommodate the use and operation of the fob module 102. The key fob 125 is sized such that the key fob 125, and by implication the balance of the fob module 102, remains with the second person. Methods to form a housing suitable for the purposes described in this disclosure are well-known and documented in the mechanical arts.

The display 126 is an electrical device. The display 126 is controlled by the second logic module 121. The display 126 mounts visibly on the key fob 125. The display 126 visibly presents interface information from the second logic module 121 to the second person.

The speaker 127 is a transducer. The speaker 127 is controlled by the second logic module 121. The speaker 127 generates the audible sound and tactile vibration used by the second logic module 121 as an alarm indication. In the first potential embodiment of the disclosure, the speaker 127 is a buzzer.

The reset switch 128 is a momentary electrical switch. The reset switch 128 is monitored by the second logic module 121. The reset switch 128 is actuated, the second logic module 121 will sever the wireless communication link 104 between the CSS sensor module 101 and the fob module 102 and will then attempt to reestablish the wireless communication link 104 between the CSS sensor module 101 and the fob module 102. The reset switch 128 provides the invention 100 with a reboot capability used for maintenance purposes.

The child safety seat 103 is a seat that is installed in a vehicle. The child safety seat 103 is a restraining device that secures the first person to a fixed position in the vehicle thereby preventing the first person from being thrown out of the child safety seat 103 during an unfortunate event. The use of a child safety seat 103 is well-known and documented in our society. The child safety seat 103 further comprises a CSS housing slot 131.

The CSS housing slot 131 is a negative space that is formed in the child safety seat 103. The CSS housing slot 131 is sized such that the CSS module housing 115 inserts into the CSS housing slot 131. The CSS housing slot 131 is positioned in the child safety seat 103 such that the weight of the first person will be detected by the weight sensor 116 of the CSS sensor module 101.

The following definitions were used in this disclosure:

Battery: As used in this disclosure, a battery is a chemical device consisting of one or more cells, in which chemical energy is converted into electricity and used as a source of power. Batteries are commonly defined with a positive terminal and a negative terminal.

Bluetooth: As used in this disclosure, Bluetooth is a standardized communication protocol that is used to wirelessly interconnect electronic devices.

Buzzer: As used in this disclosure, a buzzer is two lead electrical device that generates an audible sound and a tactile vibration when a voltage is applied to the two leads.

Child Safety Seat: As used in this disclosure, a child safety seat is a safety device configured for use with an automobile. The child safety seat is a restraining device that protects a child from injury should an unfortunate event occur to the automobile.

Display: As used in this disclosure, a display is a surface upon which is presented an image, potentially including, but not limited to, graphic images and text, that is interpretable by an individual viewing the projected image in a meaningful manner.

Form Factor: As used in this disclosure, the term form factor refers to the size and shape of an object.

GPS: As used in this disclosure, and depending on the context, GPS refers to: 1) a system of navigational satellites that are used to determine the position and velocity of a person or object; 2) the system of navigational satellites referred to in the first definition that are used to synchronize to global time; or, 3) an electronic device or that uses the system of navigational satellites referred to in the first definition to determine the position of a person or object. GPS is an acronym for Global Positioning System.

Housing: As used in this disclosure, a housing is a rigid casing that encloses and protects one or more devices.

LCD: As used in this disclosure, LCD is an acronym for Liquid Crystal Display. A liquid crystal display comprises a liquid crystal film placed between two sheets of transparent material. The visual characteristics of the LCD can be varied through the application of a voltage.

Logic Module: As used in this disclosure, a logic module is a readily and commercially available electrical device that is programmable and that accepts digital and analog inputs, processes the digital and analog inputs according to previously stored instruction and provides the results of these instructions as digital or analog outputs.

Key Fob: As used in this disclosure, a key fob is a transmitting device used to unlock a locked structure. Key fobs are often said to provide "keyless entry."

Momentary Switch: As used in this disclosure, a momentary switch is a biased switch in the sense that the momentary switch has a baseline position that only changes when the momentary switch is actuated (for example when a pushbutton switch is pushed or a relay coil is energized). The momentary switch then returns to the baseline position once the actuation is completed. This baseline position is called the "normal" position. For example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

Negative Space: As used in this disclosure, negative space is a method of defining an object through the use of open or empty space as the definition of the object itself, or, through the use of open or empty space to describe the boundaries of an object.

Piezoelectric Effect: As used in this disclosure, the piezoelectric effect refers to a class of materials wherein a strain placed upon the material will result in a redistribution of electrons within the material in a manner that causes an electric charge. This electric charge can be measured as a voltage potential across the material. This effect can be reversed in some of these materials such that the application of an AC voltage to the material will cause a vibration within the material. A material commonly used to take advantage of the piezoelectric effect is polyvinylidene difluoride which is also known as PVDF.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

WiFi: As used in this disclosure, WiFi refers to the physical implementation of a collection of wireless electronic communication standards commonly referred to as IEEE 802.11x.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An alarm system comprising:
    a CSS sensor module, a fob module, and a wireless communication link;
    wherein the wireless communication link establishes a communication link between the CSS sensor module and the fob module;
    wherein the alarm system is configured for use with a child safety seat;
    wherein the alarm system detects when a first person occupies the child safety seat
    wherein the alarm system monitors the location of the child safety seat;
    wherein a key fob is adapted to be in custody of a second person;
    wherein the alarm system compares the span of the distance between the key fob and the child safety seat;
    wherein the alarm system generates an alarm at the key fob when the span of the distance between the key fob and the child safety seat become greater than a previously determined maximum distance;
    wherein the CSS sensor module removably installs in the child safety seat;
    wherein the CSS sensor module is an electrical circuit;
    wherein the CSS sensor module detects a weight of greater than or equal to 5.0 pounds in the child safety seat;
    wherein the CSS sensor module determines the GPS coordinates of the CSS sensor module;
    wherein the CSS sensor module transmits the GPS coordinates of the CSS sensor module over the wireless communication link to the fob module;
    wherein the fob module mounts in the key fob;
    wherein the fob module is an electrical circuit;
    wherein the fob module monitors the CSS sensor module for the transmitted signal containing the GPS coordinates of the CSS sensor module;
    wherein the fob module receives the GPS coordinates of the CSS sensor module;
    wherein the fob module monitors the GPS coordinates of the fob module;
    wherein the fob module uses the GPS coordinates of the CSS sensor module and the GPS coordinates of the fob module to calculate the span of the distance between the fob module and the CSS sensor module;
    wherein should the span of the distance between the fob module and the CSS sensor module exceed a previously determined maximum distance, the fob module generates an audible sound and tactile vibration;
    wherein the CSS sensor module comprises a first logic module, a first communication module, a first GPS module, a first battery, a CSS module housing, and a weight sensor;
    wherein the first logic module, the first communication module, the first GPS module, the first battery, and the weight sensor are electrically interconnected;
    wherein the CSS module housing contains the first logic module, the first communication module, the first GPS module, the first battery, and the weight sensor;
    wherein the fob module comprises a second logic module, a second communication module, a second GPS module, a second battery, the key fob, a display, a speaker, and a reset switch;
    wherein the second logic module, the second communication module, the second GPS module, the second battery, the display, the speaker, and the reset switch are electrically interconnected;
    wherein the key fob contains the second logic module, the second communication module, the second GPS module, the second battery, the display, the speaker, and the reset switch are electrically interconnected.

2. The alarm system according to claim 1
    wherein the first logic module is a programmable electronic device;
    wherein the first communication module establishes a wireless communication link between the CSS sensor module and the fob module;
    wherein the first communication module is a wireless electronic communication device;
    wherein the first communication module allows the first logic module to communicate with the fob module wirelessly.

3. The alarm system according to claim 2
    wherein the first GPS module is an electrical device;
    wherein the first GPS module communicates with the GPS to determine the GPS coordinates of the first GPS module;
    wherein the first GPS module transfers the GPS coordinates to the first logic module.

4. The alarm system according to claim 3
    wherein the first battery is a chemical device;
    wherein the first battery provides the CSS sensor module with the electrical energy required for the operation of the CSS sensor module.

5. The alarm system according to claim 4
    wherein the weight sensor is a sensor formed from a piezoelectric material;
    wherein the weight sensor is positioned in the child safety seat such that the weight sensor deforms when a weight is contained in the child safety seat.

6. The alarm system according to claim 5
    wherein the first logic module monitors the weight sensor;
    wherein the first logic module initiates the transmission of the GPS coordinates to the fob module when the weight sensor detects a weight greater than or equal to five pounds is detected in the child safety seat by the weight sensor.

7. The alarm system according to claim 6 wherein the weight sensor mounts on the exterior surface of the CSS module housing.

8. The alarm system according to claim 7
    wherein the second logic module is a programmable electronic device;
    wherein the second communication module is a wireless electronic communication device that allows the second logic module to communicate with the CSS sensor module wirelessly;
    wherein the second communication module establishes a wireless communication link between the fob module and the CSS sensor module.

9. The alarm system according to claim 8
    wherein the second GPS module is an electrical device that communicates with the GPS to determine the GPS coordinates of the second GPS module;
    wherein the second GPS module transfers the GPS coordinates to the second logic module.

10. The alarm system according to claim 9
wherein the second battery is a chemical device;
wherein the second battery provides the fob module with the electrical energy required for the operation of the fob module.

11. The alarm system according to claim 10
wherein the display is an electrical device;
wherein the display is controlled by the second logic module;
wherein the display mounts visibly on the key fob;
wherein the display visibly presents interface information from the second logic module.

12. The alarm system according to claim 11
wherein the speaker is a transducer;
wherein the speaker is controlled by the second logic module;
wherein the speaker generates the audible sound and tactile vibration;
wherein the reset switch is a momentary electrical switch;
wherein the reset switch is monitored by the second logic module.

13. The alarm system according to claim 12
wherein the child safety seat further comprises a CSS housing slot;
wherein the CSS housing slot is a negative space that is formed in the child safety seat;
wherein the CSS housing slot is sized such that the CSS module housing inserts into the CSS housing slot;
wherein the CSS housing slot is positioned in the child safety seat such that the weight of the first person will be detected by the weight sensor of the CSS sensor module.

14. The alarm system according to claim 13 wherein the reset switch is actuated, the second logic module reboots the wireless communication link between the CSS sensor module and the fob module.

15. The alarm system according to claim 14 wherein the speaker is a buzzer.

* * * * *